(12) United States Patent
Philpott (10) Patent No.: US 6,293,371 B1
(45) Date of Patent: Sep. 25, 2001

(54) DISC BRAKE ASSEMBLY

(75) Inventor: Daniel James Philpott, Southfield, MI (US)

(73) Assignee: Meritor Automotive, Inc., Troy, MI (US)

( * ) Notice: Subject to any disclaimer, the term of this patent is extended or adjusted under 35 U.S.C. 154(b) by 0 days.

(21) Appl. No.: 09/423,322

(22) PCT Filed: Jun. 5, 1998

(86) PCT No.: PCT/GB98/01665

§ 371 Date: Mar. 20, 2000

§ 102(e) Date: Mar. 20, 2000

(87) PCT Pub. No.: WO98/55775

PCT Pub. Date: Dec. 10, 1998

(30) Foreign Application Priority Data

Jun. 6, 1997 (GB) .................................................. 9711617

(51) Int. Cl.[7] ............................................................ F16D 55/02
(52) U.S. Cl. ...................... 188/71.9; 188/72.7; 188/196 P
(58) Field of Search ................................. 188/71.4, 71.3, 188/71.7, 71.8, 71.9, 72.6, 72.7, 72.9, 196 R, 196 V, 196 P, 196 M, 196 D, 196 B, 196 BA; 192/111 A (56) References Cited

U.S. PATENT DOCUMENTS

| 4,116,307 | * | 9/1978 | Reinecke | 188/72.4 |
|---|---|---|---|---|
| 4,461,371 | * | 7/1984 | Feldmann et al. | 188/71.9 |
| 4,546,860 | * | 10/1985 | Feldmann et al. | 188/71.9 |
| 4,582,175 | | 4/1986 | Yanai . | |
| 5,060,765 | * | 10/1991 | Meyer | 188/71.9 |
| 5,307,905 | | 5/1994 | Hall, III et al. . | |

FOREIGN PATENT DOCUMENTS 1255521    11/1967  (DE) .

* cited by examiner

*Primary Examiner*—Douglas C. Butler
*Assistant Examiner*—Thomas J. Williams
(74) *Attorney, Agent, or Firm*—Carlson, Gaskey & Olds (57) ABSTRACT

A vehicle brake assembly is disclosed in which a single annular piston body (20) working in a circular bore is used to apply a first one of a pair of annular pad assemblies (102, 103) to a rotor assembly (101). The brake incorporates a ball and ramp mechanism comprising a rotating plate (30) which acts via balls (35) upon an advancement plate (40). The advancement plate (40) acts upon an adjustment ring (50) which is in screw threaded engagement with a peripheral wall of the piston (20). Rotation of the adjustment ring (50) relative to the piston (20) enables brake clearance to be adjusted, and an adjuster (60) is provided to allow automatic rotation of the adjustment ring (50) so as to enable the brake to self adjust. The adjuster (60) preferably comprises a first and second cog (63, 65) connected via a spring clutch (67) and acting between teeth on the rotating plate (30) and teeth on the adjustment plate (50). A manual adjuster (70) is also disclosed. The single actuator ensured even application of pressure around the rotor (101) without the difficulty of synchronising multiple actuators.

15 Claims, 7 Drawing Sheets

DISC BRAKE ASSEMBLY

This invention relates to disc brake assemblies for vehicles of the kind in which pad assemblies provided with friction linings for engagement on opposite faces of a rotor are mounted in opposed limbs of a carrier which extends over a peripheral edge of the rotor, and an actuating mechanism provided in one of the limbs is adapted to apply one of the pad assemblies to an adjacent face of the rotor, the other pad assembly being applied to the opposite face of the rotor as a result of the reaction of the actuating mechanism.

It is known to mount the carrier on sliding pins to allow relative movement between the limbs of the carrier and the rotor. In such a brake assembly, application of the actuating mechanism applies one of the pad assemblies to the rotor and the reaction force thereby produced moves the carrier to bring the other pad into contact with the rotor.

Alternatively, the carrier may be fixed relative to a hub supporting the brake assembly and the rotor may be adapted to move slightly relative to the hub. In this case, application of the actuating means moves one of the pads into contact with the rotor which displaces the rotor towards and into engagement with the other pad assembly. This arrangement is the preferred choice for use in the present invention.

In order to ensure smooth operation of the brakes, a small brake clearance should be provided between the pad assemblies and the rotor when the brakes are inoperative. As the friction linings wear this clearance will increase and it is necessary to provide compensation for this increased wear to ensure consistent braking operation.

In high performance brake assemblies, the generation of heat between the brake rotor and the stator can be excessive. The use of materials such as carbon in the rotor and pad assemblies can alleviate such problems, but to ensure good levels of braking force whilst simplifying the design of the brake it is proposed to employ an annular pad assembly which acts over the whole or part of the rotor.

The main difficulty with the use of an annular pad assembly is that of ensuring that even application of the annular pad assembly to the rotor is achieved in a simple manner using a minimum of parts.

To meet the requirements of producing a high performance brake assembly employing annular pad assemblies, the inventor proposes the use of an annular piston as the actuating mechanism which can generate substantially even braking force around a circumference of the rotor.

In accordance with the present invention, in a vehicle brake assembly of the kind set forth, the actuating mechanism comprises an annular piston working in an annular bore in the first limb defined by inner and outer concentric walls and moveable between a retracted position which determines the braking clearance and an advanced brake-applying position, a ball and a ramp assembly housed in an annular space between the walls and acting between the piston and the first limb to urge the piston towards the rotor in the brake applying position to apply the brake, and an annular adjustment ring through which the expander acts on the piston, the ring being in screw threaded engagement with one of the walls, and an adjuster adapted to rotate the ring with respect to the piston to advance the piston relatively towards the rotor to compensate for wear of the friction linings thereby to maintain the piston in a retracted position in which the braking clearance is substantially consistent.

By providing an annular piston which applies the pad assemblies to the rotor which is substantially concentrically aligned with the rotor, it is possible to ensure even application of the pad assemblies around the rotor circumference. It also overcomes potential problems which occur with the use of multiple pistons which require some method of synchronising the rate of advance of each piston to ensure even application. Parts count is also reduced, increasing reliability and reducing cost.

Preferably, annular pad assemblies are employed having a single continuous annular friction lining. Of course, the annular pad assemblies may comprise a number of pad segments spaced around a circumference of the rotor (i.e. a discontinuous friction surface).

The ball and ramp mechanism, in one advantageous arrangement, includes at least one rotating plate and one advancing plate comprising an annular ring. On rotational operation of the ball and ramp assembly the rotating plate rotates about its axis causing the advancement plate which is prevented from rotating by the first limb to advance towards the friction linings. This advancement plate may be adapted to act upon the adjustment ring, in turn to advance the piston towards the rotor. To prevent rotation of the piston, a lug on the piston may co-operate with a key way on the carrier.

It will be appreciated that operation of the ball and ramp mechanism may advance the advancement plate towards the piston before advancing the piston towards the rotor. The rotor, which is axially displaceable between the pad assemblies is then displaced by the friction lining supported by the amount of axial displacement of the advancement plate required to apply both friction linings to the rotor is dependent upon the degree of brake clearance. As the friction linings wear, the amount of displacement needed in order to engage the brakes will increase, and hence the amount of displacement of the advancement plate will be larger for large clearances than for small clearances.

In order to facilitate automatic adjustment of brake clearance, an automatic adjuster is provided which is adapted to rotate the adjustment ring relative to the piston. Since the advancement plate acts upon the piston through the adjustment ring, by rotating the advancement ring relative to the piston, the spacing between the ring and the adjustment plate can be varied. This causes the piston to advance for a given position of the advancement plate as the adjustment ring is moved along the screw thread on the piston.

In order to automatically rotate the adjustment ring, to compensate for friction material wear and maintain constant brake clearance, in a most preferred embodiment the adjuster comprises a first and second axially displaced cog connected via a spring means which allows relative rotation between the cogs against the spring force, the first cog-operating with the rotating plate of the ball and ramp assembly and the second cog co-operating with the adjustment ring.

The connection means between the first and second cog is that of a bidirectional clutch. This clutch is arranged such that in the direction of drive provided to the first cog by the rotation of the rotating plate during brakes being applied, there is sufficient torque transferred to the adjustment ring via the second cog, to rotate the adjustment ring in the direction that reduces the brake clearance whilst there is still brake clearance. After brake clearance has been removed the frictional forces in the brake increase to such a level that there is no longer sufficient torque transferred to the adjustment ring via the second cog to rotate the adjustment ring in the direction that reduces the brake clearance. Thus the clutch slips allowing relative rotation of the first and second cog without adjustment. In the direction of rotation of the rotating plate during brakes being released, there is in-sufficient torque transferred to the adjustment ring via the second cog, to rotate the adjustment ring in the direction that increases brake clearance and thus the adjustment ring does not rotate.

Preferably there is a rotational clearance between the meshing of the teeth of either or both of the cogs and its co-operating part. This clearance is equivalent to the amount of rotation of the rotating plate that gives an axial travel of the advancement plate equal to the intended brake clearance.

The operation of the automatic adjuster may be as follows. On operation of the brakes, the rotating plate rotates relative to the carrier whilst advancing the advancing plate towards the rotor. After advancement of the advancing plate equal to the intended brake clearance the automatic adjuster will provide positive rotational drive to the adjustment ring.

In a further refinement, a manual adjuster may be provided which allows manual resetting of the brakes, e.g. after a service in which worn pads are replaced with new pads. In this case, it is necessary to rewind the adjustment ring along the piston. The adjuster may comprise an axial bolt having a cog provided thereon which co-operates with the second cog of the auto adjuster or directly with the adjustment ring.

The first cog of the automatic adjuster may co-operate with teeth provided over at least a portion of a circumference of the rotating plate. The second cog may co-operate with at least a toothed portion of either an external or internal circumference of the adjustment ring.

For improved braking at high temperatures, the pad assemblies may have carbon friction linings. The rotor may also comprise a carbon rotor. To aid cooling, vents may be provided between the two limbs of the carrier to allow improved air flow across the rotor and pad assemblies.

There will now be described, by way of example only, two embodiments of the present invention with reference to the accompanying drawings in which.

Figure 1A:
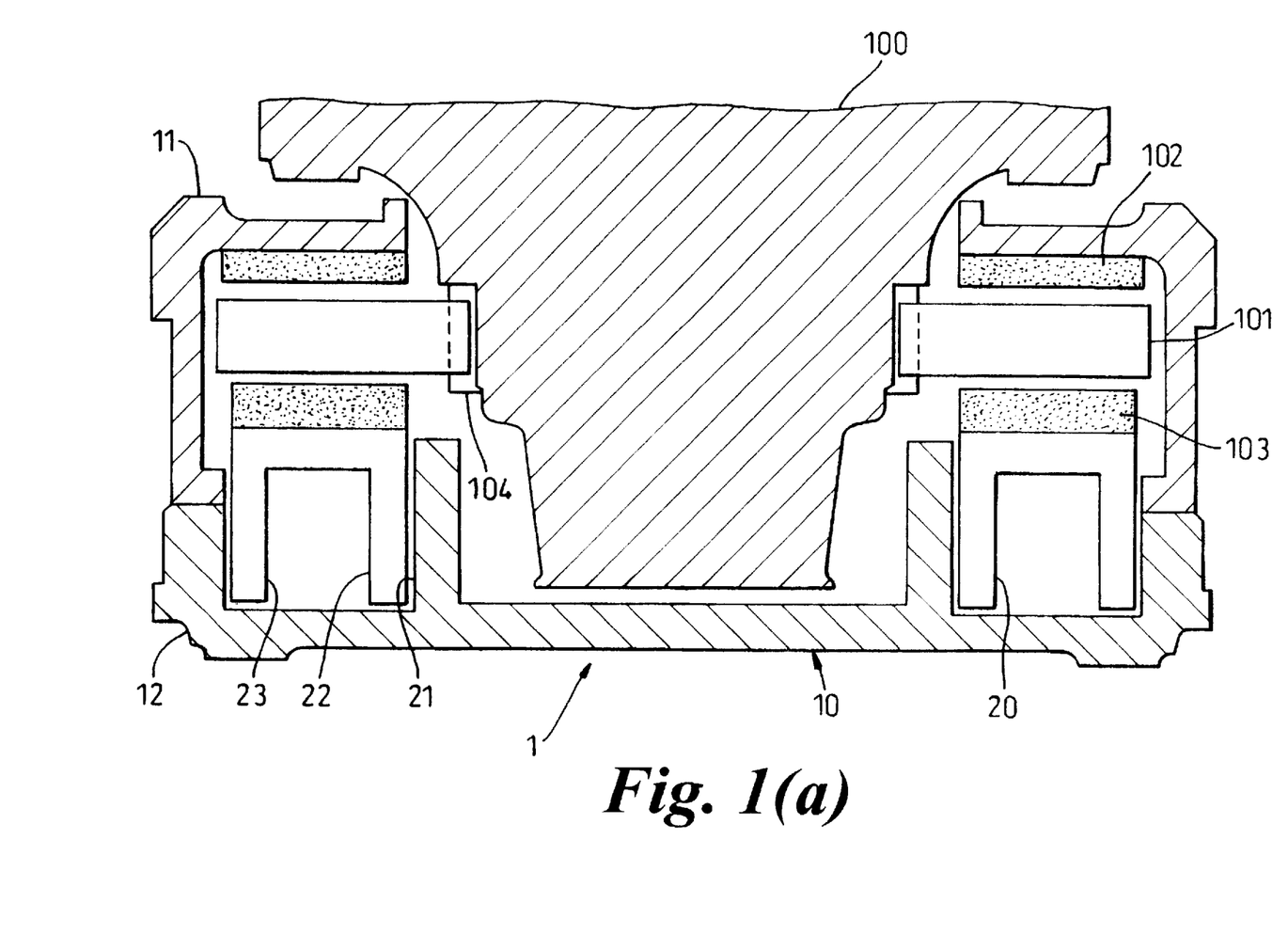
FIG. 1(a) is a schematic view showing the relative location of the carrier, the pad assemblies, the rotor and the piston of an embodiment of the invention in a retracted position.

A simplified schematic of a vehicle brake in accordance with the present invention is illustrated in FIG. 1(a).

Figure 1B:
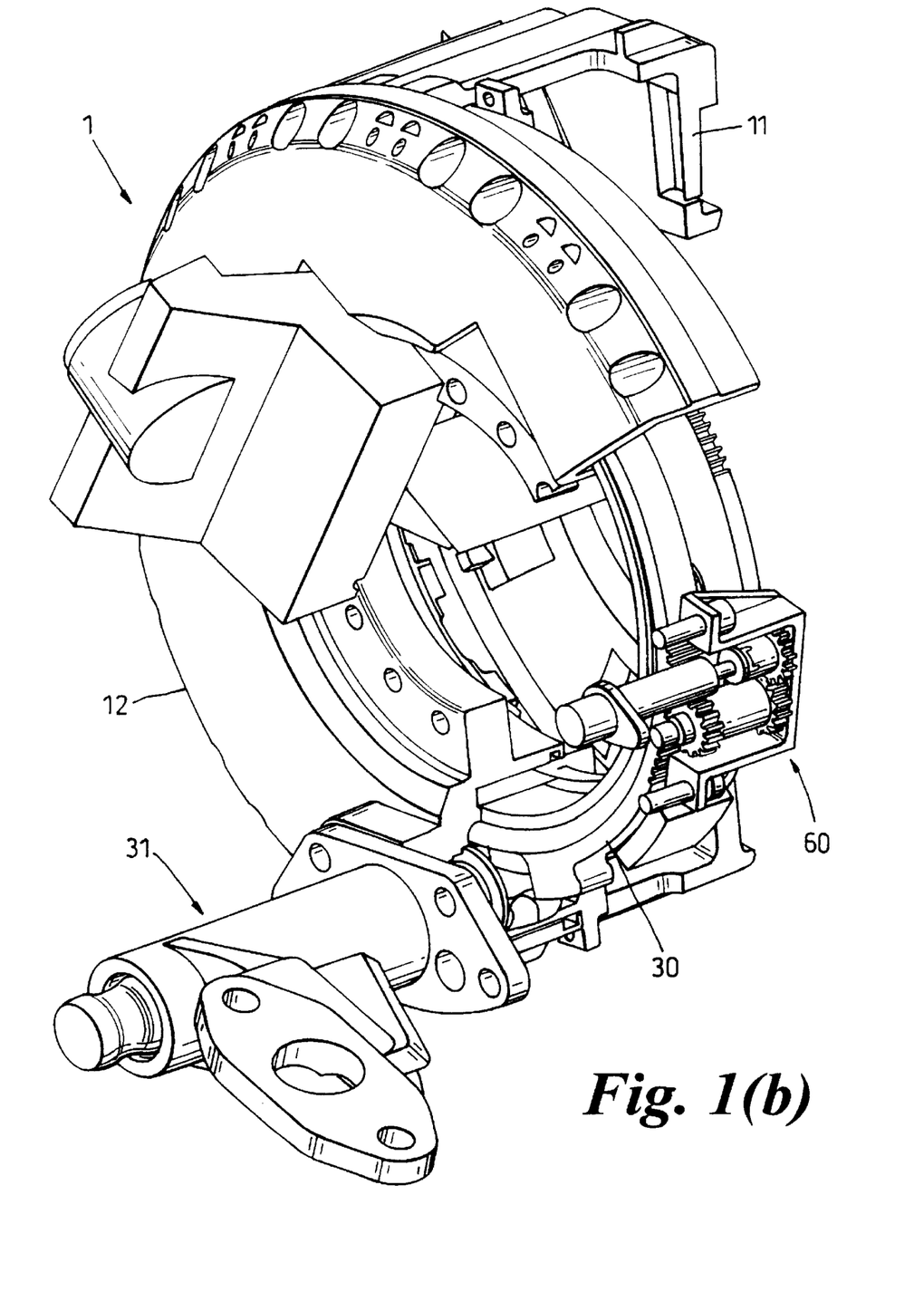
FIG. 1(b) is a partially cut-away isometric drawing of the brake of FIG. 1(a)

The brake assembly 1 comprises a carrier 10 having a first and second opposed limbs 11,12. A hub 100 of an axle of a vehicle on which the brake operates carries a brake disc 101 on a spline 104 or sliding pins (not shown) which allow the disc to move axially relative to the hub. The carrier 10 is arranged so that the first and second limbs 11,12 are disposed on opposite sides of the brake disc 101. A first brake pad assembly 102 is provided on the first limb 11. An annular piston 20 is provided which works in a bore 21 provided in the second limb 12, and a second brake pad 103 is supported by the piston 20. The piston comprises internal 22 and external 23 circumferencial walls which work within the annular bore 21. The first and second pad assemblies 102,103 are adapted to contact the brake disc 101 on operation of the brake to generate a braking friction force. The piston 20 is of relatively large dimensions and is adapted to support the annular brake pad assembly substantially concentrically relative to the brake disc.

In use, operation of the brakes causes the annular piston 20 to advance in the bore in the second limb 12 to engage the second pad 103 with a surface of the brake disc 101. The reaction force generated between the limb 12 and the piston 20 thereafter displaces the rotor 101 axially towards the first brake pad 102 so that the opposing faces of the rotor 101 are clamped between the two pad assemblies 102,103. Since annular pads are used, even brake pressure can be generated around an entire circumference of the brake disc 101.

Figure 2:
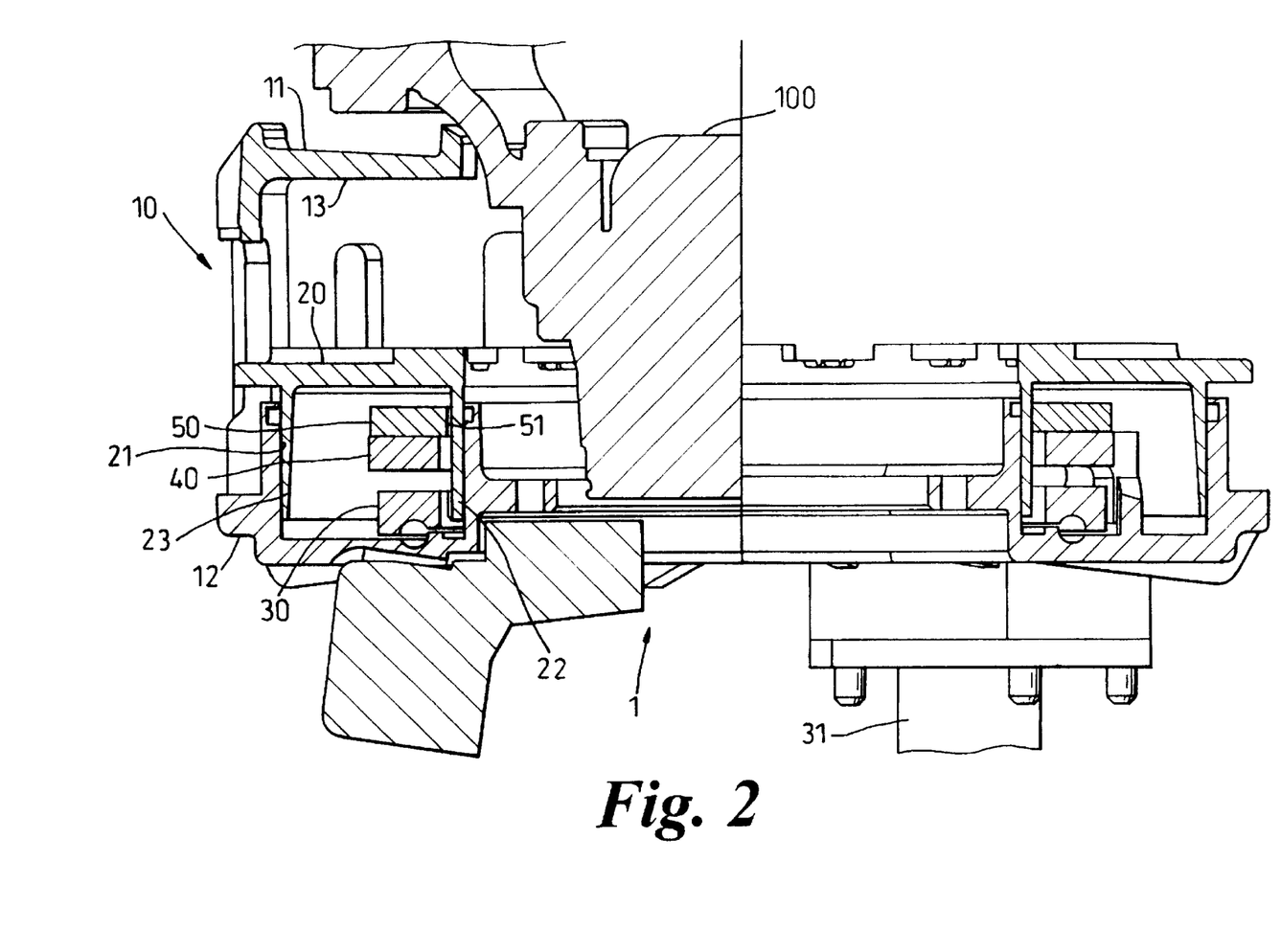
FIG. 2 shows a more detailed cross-sectional view of the brake shown in FIG. 1(a) with the pad assemblies and rotor omitted.
Figure 3:
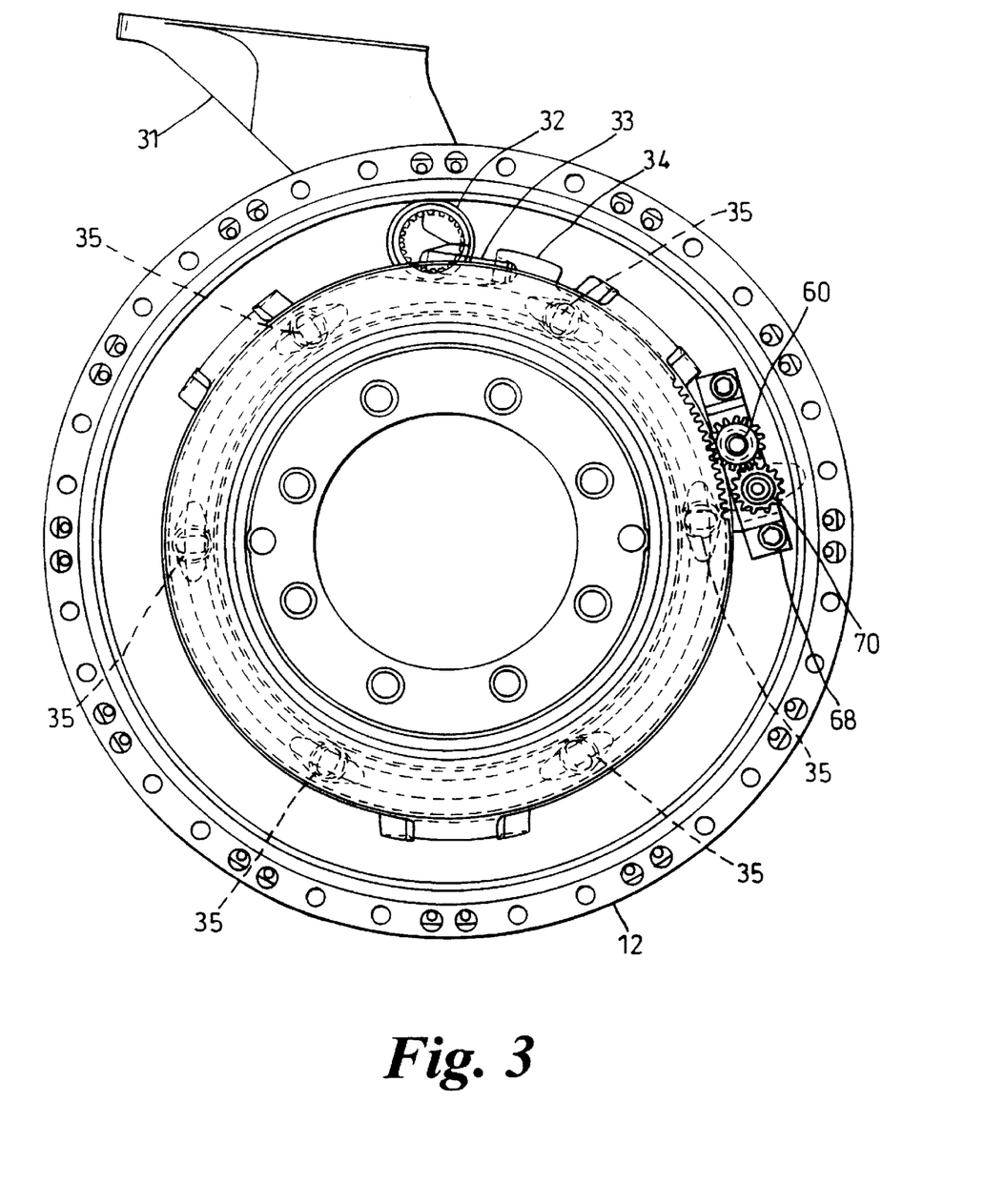
FIG. 3 shows a plan view of the brake assembly shown in FIG. 2.

FIG. 2 shows a more detailed view of a proposed embodiment of a brake assembly in accordance with the present invention. For clarity, the brake disc 101 and brake pads 102, 103 are not shown. An alternative plan view of the brake assembly is shown in FIG. 3.

The piston 20 is displaced within the bore 21 in the second limb 12 under the action of a ball and ramp assembly. A lever arm 31 is connected to the ball and ramp assembly via a rotating shaft 32 having a cam portion which acts upon a finger 33. The finger 33 acts upon a radially protruding lug 34 on the ramp mechanism to operate the ball and ramp assembly. The ball and ramp assembly includes an annular rotating plate 30. Operation of the lever 31 actuates the ball and the ramp mechanism which causes the rotating plate to rotate about its axis and via separating balls 35 displace axially the advancement plate 40 relative to the second limb 12 of the carrier. The advancement actuation plate 40 is adapted to act against an adjustment ring 50 which is in screw threaded engagement 51 with one of the walls of the piston 20. Thus, as the advancement plate 40 is axially displaced away from the second limb 12, the piston 20 is in turn advanced to apply the brakes. The annular rotating plate 30 acts on the advancement actuation plate 40 through ball bearings (shown in FIG. 4) to reduce friction between the plates 30, 40.

In use, it is necessary to provide a small amount of clearance between the pad assemblies 102, 103 and the brake disc 101. Of course, as the pad assemblies wear this clearance will necessarily increase and so adjustment means 60 are provided for adjusting the clearance.

Figure 6:
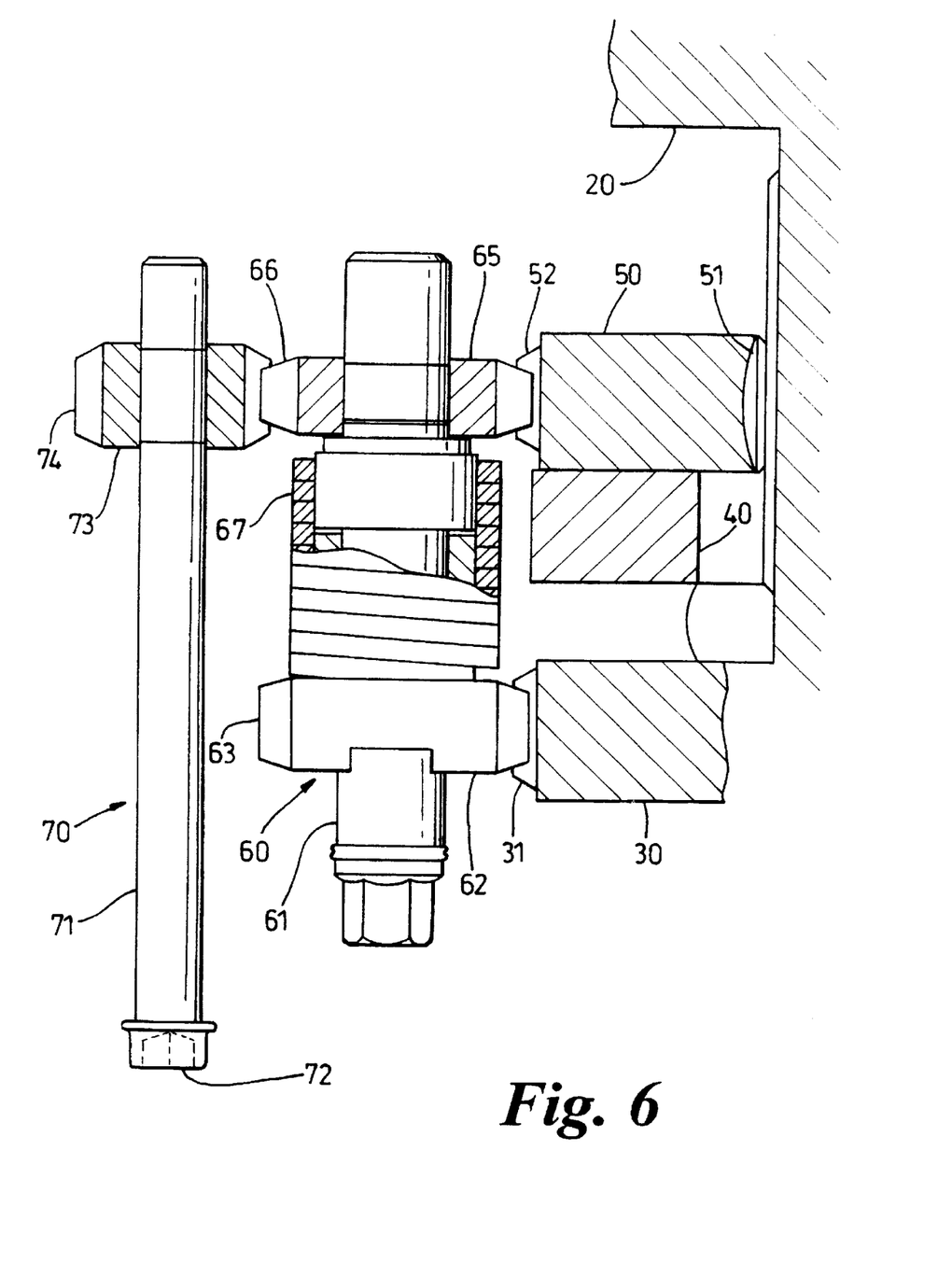
FIG. 6 is a schematic view of one possible arrangement of adjuster for both automatic and manual adjustment of brake clearance.

The adjustment means 60 is shown in detail in FIG. 6 of the accompanying drawings. The adjustment means 60 allows automatic setting of the amount of clearance at the brake.

The adjustment means 60 comprises a cylindrical member 61 which carries an annular wheel 62 having teeth 63 around its perimeter. The wheel 62 is free to rotate about the member 61. The teeth 63 engage teeth 31 provided on a peripheral portion of the rotating plate 30. The cylindrical member 61 carries a second annular wheel 65 having peripheral teeth 66 which engage with teeth 52 provided on a perimeter portion of the adjustment ring 50. The second wheel 65 is fixed against rotation relative to the member 61. The first and second wheels 62, 65 are connected via a helical clutch spring 67 with both members having a common axis of rotation coinciding with the axis of the spring 67.

The connection means between the wheel 63 and the wheel 65 is that of a clutch spring 67 with high torque in one direction and low torque in the other. This clutch spring is arranged such, that, during brakes being applied, there is sufficient torque transferred to the adjustment ring 50, to rotate the adjustment ring in the direction that reduces the brake clearance until brake clearance has been removed. After brake clearance has been removed the frictional forces in the brake increase to such a level that there is no longer sufficient torque transferred to the adjustment ring 50 to rotate the adjustment ring in the direction that reduces the brake clearance. Thus the clutch slips allowing relative rotation of the wheel 65 and wheel 63 without adjustment.

In the direction of rotation of the rotating plate during brakes being released, there is in-sufficient torque transferred via the clutch spring 67 to the adjustment ring 50 via the wheel 65, to rotate the adjustment ring in the direction that increases brake clearance and thus the adjusting ring does not rotate.

There is a rotational clearance between the meshing of the teeth of either or both of the wheels 63, 65 and its co-operating teeth 52,31. This clearance is equivalent to the rotation of the rotating plate 30 that gives an axial travel of the advancement plate 40 equal to the intended brake clearance.

The operation of the automatic adjuster may be a follows. On operation of the brakes, the rotating plate 30 rotates relative to the carrier 12 whilst advancing the advancement plate 40 towards the rotor. After advancement of the advancement plate equal to the intended brake clearance the automatic adjuster will then provide positive rotational drive to the adjustment ring. If there is excessive brake clearance then the adjustment ring 50 will rotate and thus reduce brake clearance until brake clearance has been removed. Several brake applications may be required to reduce brake clearance to the desired level.

In addition to the automatic adjuster described hereinbefore, which is not limited to the use of a helical clutch spring, a manual adjuster 70 can be provided. This is shown in detail in FIG. 6.

The manual adjuster 70 comprises an elongate axial rod 71 which carriers a cog 73 having teeth 74 disposed towards one end. The teeth 74 engage with the teeth 66 on the automatic adjuster. A hexagonal nut 72 or socket is provided on the other end of the manual adjuster 70 to enable an operator to unwind the wheel 65 and hence back off the adjustment ring 50.

It will, of course, be understood that several possible alterations may be made to the vehicle brake assembly shown in the accompanying FIGS. 1 to 6 within the scope of the present invention.

Figure 4:
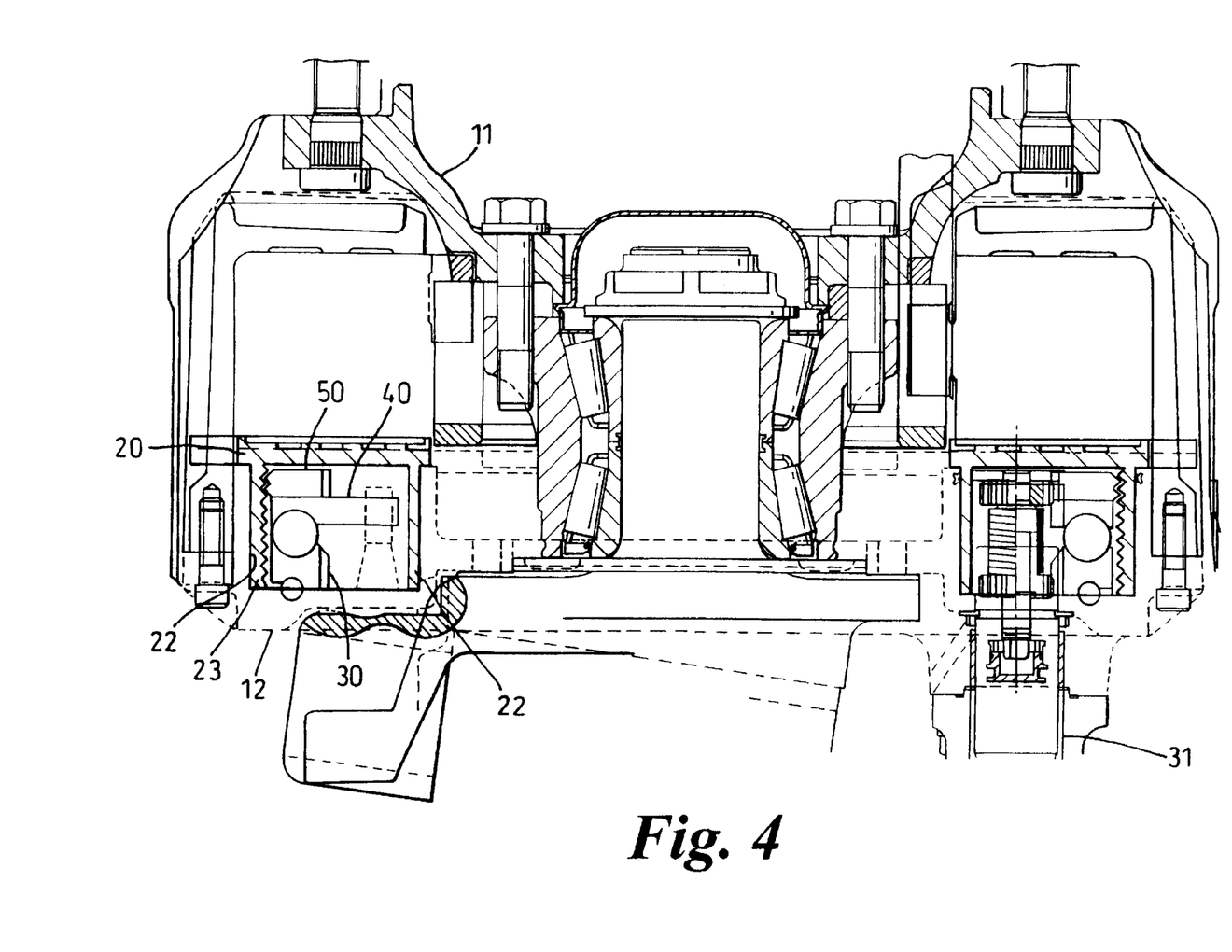
FIG. 4 shows a detailed cross-sectional view of a second embodiment of a brake in accordance with the invention.
Figure 5:
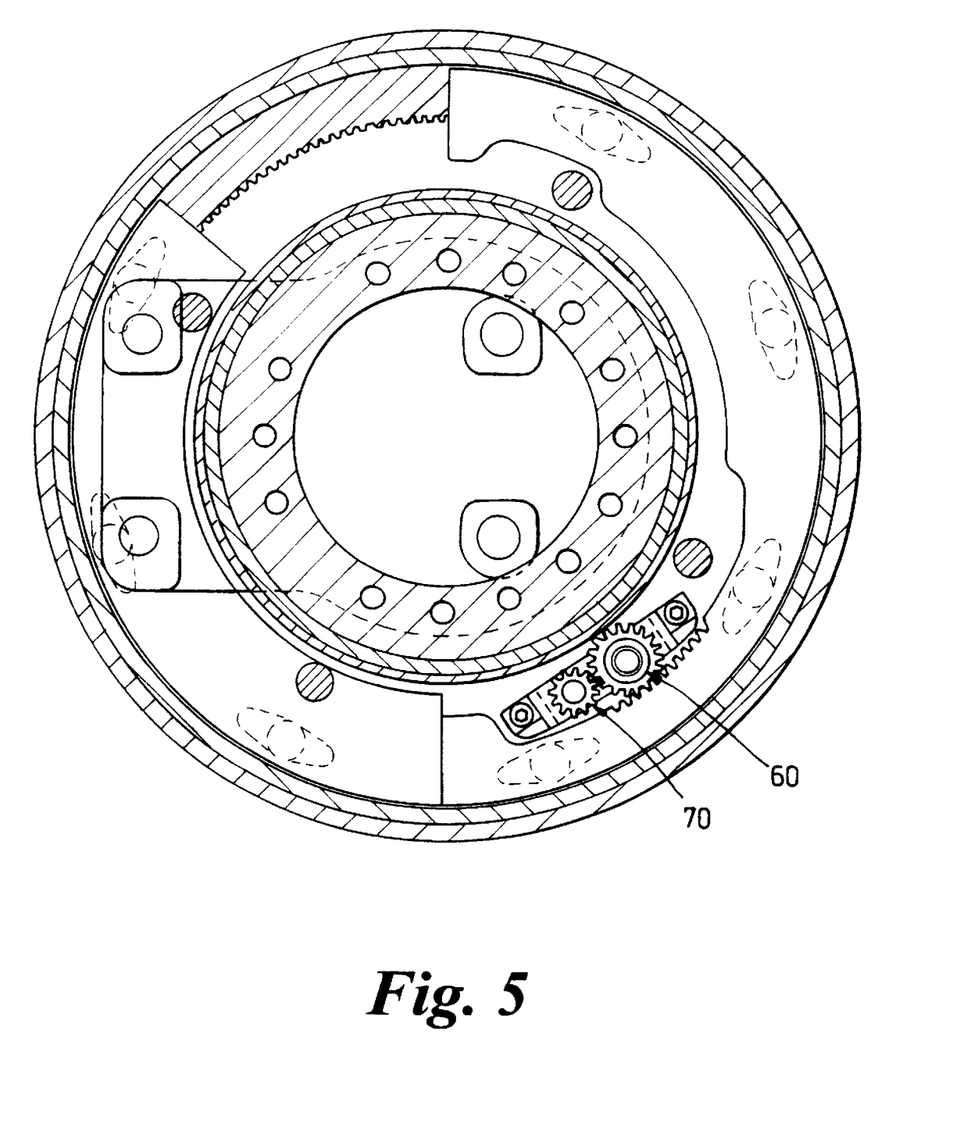
FIG. 5 shows a plan view of the brake of the second embodiment.

In FIGS. 2 and 3, the adjustment ring 50 is seen to engage an outer face of the inner circumferencial wall 22 of the piston 20. However, as shown in FIGS. 4 and 5, the adjustment ring could be adapted to engage an inner face of the outer circumferencial wall 23 of the piston 20. Furthermore, the location of the adjustment means 60 relative to the input lever 31 may be varied to fit space requirements.

The adjuster means 60, 70 may also be varied within the scope of the invention. For example, instead of a helical clutch spring 67, any other device which generates a bidirectionally varying torsional force when subjected to a torsional load across its ends could be employed. The manual adjuster 70 may be adapted to operate upon the adjustment ring 50 directly as opposed to through the wheel 65 of the automatic adjuster 60, or may be omitted if required to reduce cost. Alternatively, it may be integrated as part of the adjuster and driven directly from a form on the end of cylindrical member 61.

What is claimed is:

1. A disc brake assembly (1) for a vehicle in which pad assemblies (102, 103) provided with friction linings for engagement on opposite faces of a rotor (101) are mounted in opposed limbs (11, 12) of a carrier (10) which extends over a peripheral edge of the rotor (101), and an actuating mechanism provided in one of the limbs is adapted to apply one of the pad assemblies (102, 103) to an adjacent face of the rotor (101), the other pad assembly being applied to the opposite face of the rotor as a result of the reaction of the actuating mechanism characterized in that the actuating mechanism comprises an annular piston (20) defined by inner and outer concentric walls (22, 23) working in an annular bore (21) in said one of said limbs (11, 12) and moveable between a retracted position which determines the braking clearance and an advanced brake-applying position, a ball and a ramp assembly housed in an annular space between the walls (22, 23) and acting between the piston (20) and said one limb to urge the piston towards the rotor (101) in the brake applying position to apply the brake, and an annular adjustment ring (50) through which the ball and a ramp assembly acts on the piston (20), the ring (50) being in screw threaded engagement with one of the walls, and an adjuster adapted to rotate the ring with respect to the piston to advance the piston (20) relatively towards the rotor (101) to compensate for wear of the friction linings thereby to maintain the piston in a retracted position in which the braking clearance is substantially constant.

2. A disc brake assembly according to claim 1 characterised in that the pad assemblies (102, 103) comprise annular pad assemblies having a single continuous annular friction lining.

3. A disc brake according to claim 1 characterised in that the ball and ramp mechanism includes at least one rotating plate (30) and one advancement plate (40) comprising an annular ring whereby on rotational operation of the ball and ramp assembly the rotating plate (30) rotates about its axis causing the advancement plate (40) which is prevented from rotating by the first limb to advance towards the friction linings.

4. A disc brake according to claim 3 characterised in that the advancement plate is adapted to act upon the adjustment ring.

5. A disc brake assembly according to claim 1 characterised in that a lug on the piston co-operates with a key way on the carrier to prevent rotation of the piston.

6. A disc brake assembly according to claim 1 characterised in that an automatic adjuster (60) is provided which is adapted to rotate the adjustment ring relative to the piston.

7. A disc brake assembly according to claim 6 characterized in that the automatic adjuster comprises a first and second axially displaced cog (62, 65) connected via a spring means which allows relative rotation between the cogs against the spring force, the first cog operating with the rotating plate (30) of the ball and ramp assembly and the second cog co-operating with the adjustment ring (50).

8. A disc brake assembly according to claim 7 in which the connection between the first and second cog is a bi-directional clutch.

9. A disc brake assembly according to claim 8 characterised in that the clutch is arranged such that in the direction of drive provided to the first cog by the rotation of the rotating plate during brakes being applied there is sufficient torque transferred to the adjustment ring via the second cog to rotate the adjustment ring in the direction that reduces the brake clearance whilst there is still brake clearance.

10. A disc brake assembly according to claim 8 characterised in that a rotational clearance is provided between the meshing of the teeth of either or both of the cogs (62, 65) and its co-operating part equivalent to the amount of rotation of the rotating plate that gives an axial travel of the advancement plate equal to the intended brake clearance.

11. A disc brake assembly according to claim 7 characterised in that a manual adjuster (70) is provided which allows manual resetting of the brakes.

12. A disc brake assembly according to claim 11 characterised in that the manual adjuster (70) comprises an axial bolt (71) having a cog (73) provided thereon which co-operates with the second cog of the auto adjuster (60) or directly with the adjustment ring (50).

13. A disc brake assembly according to claim 7 characterised in that the first cog of the automatic adjuster co-operates with teeth provided over at least a portion of a circumference of the rotating plate.

14. A disc brake assembly according to claim 7 characterised in that the second cog co-operates with at least a toothed portion of either an external or internal circumference of the adjustment ring.

15. A disc brake assembly according to claim 1 characterised in that the pad assemblies have carbon friction linings and the rotor comprises a carbon rotor.

* * * * *